United States Patent [19]
Wilkinson et al.

[11] Patent Number: 5,482,680
[45] Date of Patent: * Jan. 9, 1996

[54] ELECTROCHEMICAL FUEL CELL ASSEMBLY WITH INTEGRAL SELECTIVE OXIDIZER

[75] Inventors: David P. Wilkinson, Vancouver; Henry H. Voss, West Vancouver; James Dudley, Port Moody; Gordon J. Lamont, Vancouver; Vesna Basura, Burnaby, all of Canada

[73] Assignee: Ballard Power Systems, Inc., North Vancouver, Canada

[ * ] Notice: The portion of the term of this patent subsequent to May 31, 2011, has been disclaimed.

[21] Appl. No.: 126,602

[22] Filed: Sep. 24, 1993

Related U.S. Application Data

[63] Continuation-in-part of Ser. No. 959,070, Oct. 9, 1992, Pat. No. 5,316,747.

[51] Int. Cl.$^6$ ........................................... H01M 8/04
[52] U.S. Cl. .................... 422/177; 422/190; 422/196; 429/34; 429/38; 429/39
[58] Field of Search ........................... 422/169, 177, 422/196, 190; 423/247, 246, 437 M, 656; 429/17, 19, 34, 38, 39

[56] References Cited

U.S. PATENT DOCUMENTS

| | | | |
|---|---|---|---|
| 3,088,919 | 5/1963 | Brown, Jr. et al. | 423/347 |
| 3,216,782 | 11/1965 | Cohn | 423/247 |
| 3,216,783 | 11/1965 | Cohn | 423/247 |
| 3,615,164 | 10/1971 | Baker et al. | 423/247 |
| 3,631,073 | 12/1971 | Cohn et al. | 252/443 |
| 3,663,162 | 5/1972 | Randhava | 423/247 |
| 3,852,169 | 12/1974 | Kring et al. | 204/153.16 |
| 4,046,956 | 9/1977 | Fanciullo | 429/20 |
| 4,234,317 | 11/1980 | Lucas et al. | 436/71 |
| 4,293,315 | 10/1981 | Sederquist | 48/94 |
| 4,309,359 | 1/1982 | Pinto | 429/16 |
| 4,373,452 | 2/1983 | Van Dewoestine | 422/177 |
| 4,604,275 | 8/1986 | Murib | 423/437 M |
| 4,830,844 | 5/1989 | Kolts | 423/437 M |
| 4,906,448 | 3/1990 | Sauvion et al. | 423/437 M |
| 4,910,099 | 3/1990 | Gottesfeld | 429/13 |
| 4,988,583 | 1/1991 | Watkins et al. | 429/30 |
| 5,017,357 | 5/1991 | Kolts et al. | 423/437 M |
| 5,061,464 | 10/1991 | Cordonna, Jr. et al. | 423/213.5 |
| 5,079,379 | 1/1992 | Braun et al. | 422/145 |
| 5,108,849 | 4/1992 | Watkins et al. | 429/30 |
| 5,176,966 | 1/1993 | Epp et al. | 429/35 |
| 5,252,410 | 10/1993 | Wilkinson et al. | 429/34 |
| 5,284,718 | 2/1994 | Chou et al. | 429/26 |
| 5,300,370 | 4/1994 | Washington et al. | 429/34 |
| 5,316,747 | 5/1994 | Pow et al. | 423/247 |

FOREIGN PATENT DOCUMENTS 1305212 7/1992 Canada ........................... H01M 8/22

OTHER PUBLICATIONS

"Selective Oxidation of Carbon Monoxide", *Industrial and Engineering Chemistry*, vol. 52, No. 10, pp. 841–844. Brown, Jr. et al. 1960.

"Selective Oxidation of Carbon Monoxide at a Low Temperature", *Indian Journal of Technology*, vol. 15, pp. 403–407. Chatterjee et al. Sep. 1977.

"Selective $CO_2$ Oxidation Process Raises $NH_3$ Yield", *Industrial Safety*, vol. 20, pp. 165–170. Bonacci et al. 1978.

*Primary Examiner*—Robert J. Warden
*Assistant Examiner*—Hien Tran
*Attorney, Agent, or Firm*—McAndrews, Held & Malloy, Ltd.

[57] ABSTRACT

A method and apparatus selectively oxidizes, within the fuel cell assembly, the carbon monoxide present in a fuel stream fed to the assembly. A quantity of catalyst is contained within at least a portion of a fuel stream passageway within the stack. The carbon monoxide is selectively oxidized by the catalyst to carbon dioxide, and carbon monoxide produced by the reverse water-shift reaction is also oxidized.

18 Claims, 12 Drawing Sheets

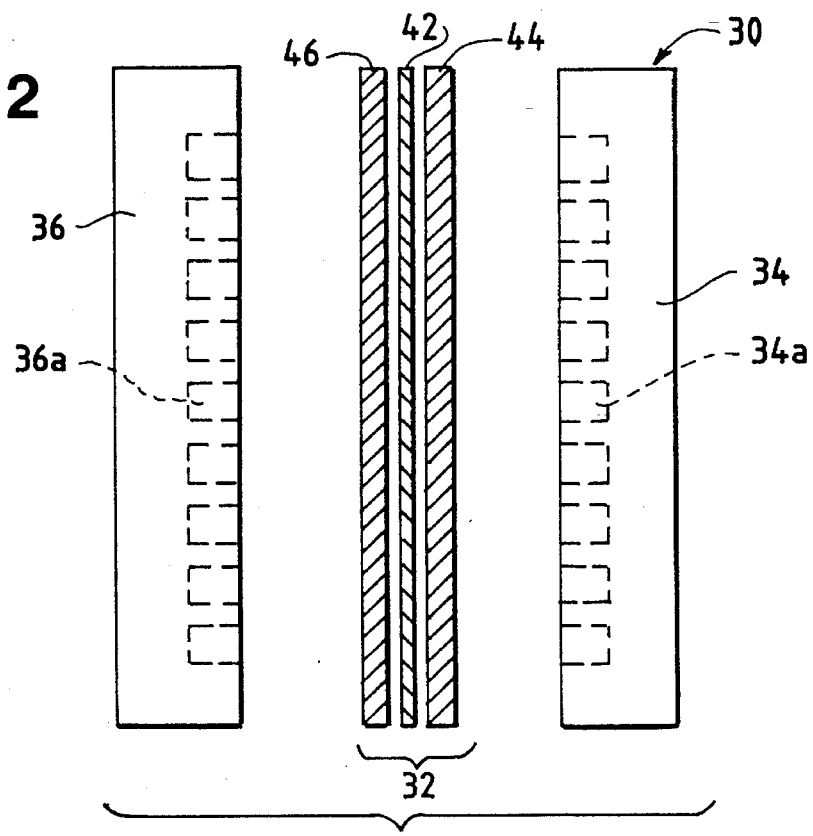
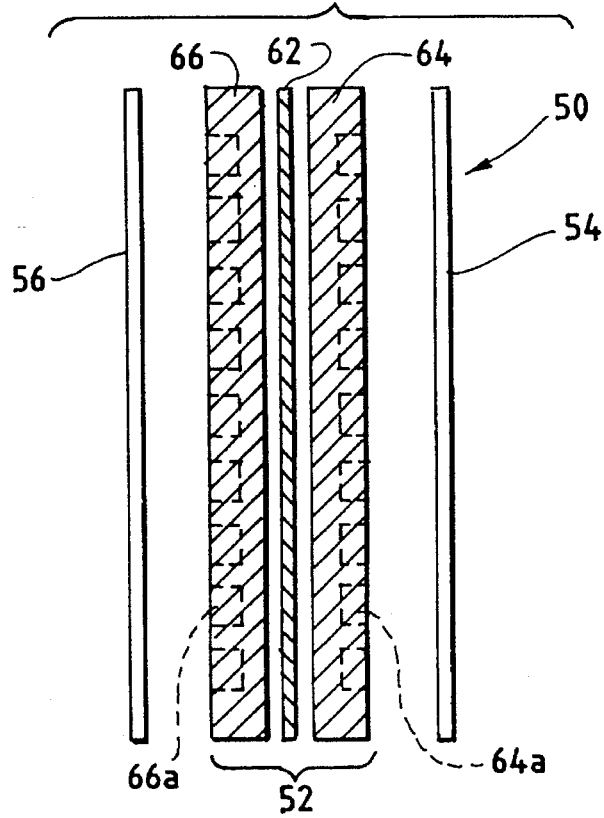

ELECTROCHEMICAL FUEL CELL ASSEMBLY WITH INTEGRAL SELECTIVE OXIDIZER

CROSS-REFERENCE TO RELATED APPLICATIONS

This application is a continuation-in-part of U.S. patent application Ser. No. 07/959,070 filed Oct. 9, 1992 now U.S. Pat. No. 5,316,747, entitled "Method And Apparatus For The Selective Oxidation Of Carbon Monoxide In A Hydrogen-Containing Gas Mixture." The '747 patent, incorporated herein by reference in its entirety, describes the selective oxidation of carbon monoxide present in a mixture of gases, including hydrogen, to carbon dioxide by introducing oxygen or an oxygen-containing gas mixture at locations along the latter portion of the reaction chamber of an isothermal reactor.

FIELD OF THE INVENTION

The present invention relates to a method and apparatus for selectively oxidizing, within the fuel cell stack, the carbon monoxide present in a fuel stream fed to the stack. In the present invention, a quantity of catalyst is contained within at least a portion of a fuel stream passageway within the stack. The carbon monoxide is selectively oxidized by the catalyst to carbon dioxide.

BACKGROUND OF THE INVENTION

Electrochemical fuel cells convert fuel and oxidant to electricity and reaction product. In electrochemical fuel cells employing hydrogen as the fuel and oxygen as the oxidant, the reaction product is water. Such fuel cells generally employ a membrane electrode assembly ("MEA") consisting of a solid polymer electrolyte or ion exchange membrane disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes through an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to complete the electrochemical reaction and form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to complete the electrochemical reaction and form liquid water as the reaction product.

In conventional fuel cells, the MEA is interposed between two fluid-impermeable, electrically conductive plates, commonly referred to as the anode and the cathode plates, respectively. The plates are typically formed from graphite, a graphite composite such as graphite/epoxy, but can also be formed from other suitable electrically conductive materials. The plates serve as current collectors, provide structural support for the porous, electrically conductive electrodes, provide means for carrying the fuel and oxidant to the anode and cathode, respectively, and provide means for removing water formed during operation of the fuel cell. When the channels are formed in the anode and cathode plates, the plates are referred to as fluid flow field plates. When the anode and cathode plates overlay channels formed in the anode and cathode porous material, the plates are referred to as separator plates.

Reactant feed manifolds are generally formed in the anode and cathode plates, as well as in the MEA, to direct the fuel (typically a substantially pure hydrogen gas stream or hydrogen-containing reformate gas stream from the conversion of hydrocarbons such as methanol or natural gas) to the anode and the oxidant (typically substantially pure oxygen or oxygen-containing gas) to the cathode via the channels formed in either the fluid flow field plates or the electrodes themselves. Exhaust manifolds are also generally formed in the anode and cathode plates, as well as the MEA, to direct the unreacted components of the fuel and oxidant streams, as well as water accumulated at the cathode, from the fuel cell.

Multiple fuel cell assemblies comprising two or more anode plate/MEA/cathode plate combinations, referred to as a fuel cell stack, can be connected together in series (or in parallel) to increase the overall power output as required. In such stack arrangements, the cells are most often connected in series, wherein one side of a given fluid flow field or separator plate is the anode plate for one cell, the other side of the plate is the cathode plate for the adjacent cell, and so on.

Perfluorosulfonic ion exchange membranes, such as those sold by DuPont under its NAFION trade designation, have been used effectively in electrochemical fuel cells. Fuel cells employing Perfluorosulfonic cation exchange membranes require accumulated water to be removed from the cathode (oxidant) side, both as a result of the water transported across the membrane with cations and product water formed at the cathode from the electrochemical reaction of hydrogen cations with oxygen. An experimental perfluorosulfonic ion exchange membrane, sold by Dow Chemical Company under the trade designation XUS 13204.10, appears to have significantly less water transported with hydrogen cations across the membrane. Fuel cells employing the Dow experimental membrane thus tend to accumulate less on the cathode (oxidant) side, as the accumulated water at the cathode is essentially limited to product water formed from the electrochemical reaction of hydrogen and oxygen.

Recently, efforts have been devoted to identifying ways to operate electrochemical fuel cells using other than pure hydrogen as the fuel. Fuel cell systems operating on pure hydrogen are generally disadvantageous because of the expense of producing and storing pure hydrogen gas. In addition, the use of liquid fuels is preferable to pure, bottled hydrogen in mobile and vehicular applications of electrochemical fuel cells.

Recent efforts have focused on the use of an impure hydrogen fuel stream obtained from the chemical conversion of hydrocarbon fuels to hydrogen and carbon byproducts. However, to be useful for fuel cells and other similar hydrogen-based chemical applications, hydrocarbon fuels must be efficiently converted to relatively pure hydrogen with a minimal amount of undesirable chemical byproducts, such as carbon monoxide.

Conversion of hydrocarbons to hydrogen is generally accomplished through the steam reformation of a hydrocarbon such as methanol in a reactor sometimes referred to as a reformer. The hydrogen-containing stream exiting the reformer is generally referred to as the reformate stream. The steam reformation of methanol is represented by the following chemical equation:

$$CH_3OH + H_2O + heat \rightleftharpoons 3H_2 + CO_2 \quad (1)$$

Due to competing reactions, the initial gaseous mixture produced by steam reformation of methanol typically contains about 65% to about 75% hydrogen, about 10% to about 25% carbon dioxide, as well as from about 0.5% to about 20% by volume of CO, all on a dry basis (in addition, water vapor can be present in the gas stream). The initial gas mixture produced by the steam reformer can be further processed by a shift reactor (sometimes called a shift converter) to reduce the CO content to about 0.2%–2% by volume, on a dry basis. The catalyzed reaction occurring in the shift converter is represented by the following chemical equation:

$$CO + H_2O \rightleftharpoons CO_2 + H_2 \quad (2)$$

Even after a combination of steam reformer/shift converter processing, the product gas mixture will have minor amounts of CO and various hydrocarbon species, typically about 5% or less by volume, on a dry basis, of the total product mixture.

In low-temperature, hydrogen-based fuel cell applications, the presence of CO in the inlet fuel stream, even at the 0.1% to 1% level, is generally unacceptable. In solid polymer electrolyte fuel cells, the electrochemical reaction is typically catalyzed by an active catalytic material comprising a noble metal such as platinum. Carbon monoxide adsorbs preferentially to the surface of platinum, particularly at temperatures below about 150° C., effectively poisoning the catalyst, and significantly reducing the efficiency of the desired electrochemical hydrogen oxidation reaction. A steam reformer/shift converter process can be used to reduce the amount of CO in the hydrogen-containing reformate gas stream to less than about 100 parts per million (ppm). In order to employ such a CO-containing reformate stream as the fuel stream for a fuel cell, the fuel cell must first be able to handle (i.e., the catalyst present in the MEAs cannot be poisoned by) the CO present in the reformate fuel stream. In addition to the CO content of the reformate fuel stream, CO can also be produced in the fuel cell by the reverse water shift reaction:

$$CO_2 + H_2 \rightleftharpoons CO + H_2O \quad (3)$$

In typical reformate fuel streams, the equilibrium concentration of CO is about 100 ppm near room temperature.

The present method and apparatus selectively oxidizes, within the fuel cell itself, the carbon monoxide present in the incoming reactant stream of a fuel cell and/or produced by the reverse water shift reaction (reaction (3) above).

Watkins et al. Canadian Patent No. 1,305,212 entitled "Method for Operating a Fuel Cell on Carbon Monoxide Containing Fuel Gas" discloses the oxidation of carbon monoxide present in a fuel gas introduced to a low-temperature, solid polymer electrolyte fuel cell which employs a noble metal catalyst, such as platinum, rhodium or ruthenium, in the anode. The method involves (a) reacting the fuel gas with an oxygen-containing gas, (b) contacting the resulting fuel gas mixture with a suitable catalyst to selectively convert carbon monoxide to carbon dioxide and thereby reduce carbon monoxide levels in the fuel gas to trace amounts, and (c) feeding the resulting substantially carbon monoxide-free fuel gas to the fuel cell.

Gottesfeld U.S. Pat. No. 4,910,099 entitled "Preventing CO Poisoning In Fuel Cells" discloses the injection of oxygen ($O_2$) into the fuel stream, before introducing the fuel stream to the fuel cell, in order to remove CO present in the reformate fuel stream fed to the fuel cell. The oxygen so injected is in the form of either substantially pure $O_2$ or oxygen-containing air.

Watkins' selective oxidation of carbon monoxide to carbon dioxide and Gottesfeld's injection of oxygen into the reformate fuel stream prior to introducing the fuel stream to the fuel cell, both effectively remove CO initially present in the fuel stream. However, the removal of CO upstream of the fuel cell will not affect the further production of CO within the reactant fuel stream of the fuel cell by the reverse water shift reaction. In this regard, the removal of CO from the fuel stream by selective oxidation and/or the initial injection of oxygen, will promote the production of CO by the reverse water shift reaction to produce CO (i.e., reaction (3) above will be driven to the right) because of the substantial presence of carbon dioxide and hydrogen in the fuel stream, as well as the presence of the platinum electrocatalyst in the fuel cell. In order to effectively remove CO produced in the reactant stream of the fuel cell, oxidant (either substantially pure oxygen or oxygen-containing air) should be introduced, preferably in a substantially uniform manner, across the active area of the fuel cell in which electrocatalyst is present. The uniform introduction of oxidant is particularly effective for fuel cell designs having large active areas and in which the residence time of the reformate fuel stream in the fuel cell is prolonged.

Accordingly, it is an object of the present invention to provide a method and apparatus for oxidizing the carbon monoxide present in a reactant stream mixture comprising hydrogen so as to render the mixture suitable for use as the fuel stream for electrochemical fuel cells, and for other applications employing catalysts that would be adversely effected by higher carbon monoxide concentrations.

It is also an object of the invention to provide a method and apparatus for the oxidation of carbon monoxide to carbon dioxide in a flow passageway, which contains catalyst, within the fuel cell stack.

SUMMARY OF THE INVENTION

The above and other objects are achieved by a method and apparatus for the selective oxidation of carbon monoxide to carbon dioxide, the carbon monoxide being present in a reactant stream introduced to an electrochemical fuel cell, the reactant stream further comprising hydrogen and carbon dioxide. An embodiment of the method comprises the steps of:

providing a quantity of catalyst within at least a portion of a passageway for directing the reactant stream to the electrochemically active area of the fuel cell, the passageway portion having an inlet and an outlet, the catalyst promoting the oxidation of carbon monoxide to carbon dioxide in the presence of oxygen;

introducing a first oxygen-containing gas stream into the reactant stream through a first port disposed between the inlet and the outlet;

contacting the gaseous mixture including the first oxygen-containing gas stream with the catalyst;

introducing a further oxygen-containing gas stream into the reactant stream through at least one secondary port located between the first port and the outlet; and further contacting the reactant stream including the further oxygen-containing gas stream with the catalyst.

In the preferred embodiment of the method, the at least one secondary port comprises a plurality of secondary ports located between the first port and the outlet. The plurality of secondary ports are preferably uniformly spaced along the portion between the inlet and the outlet, whereby the concentration of oxygen within the reactant stream is maintained substantially constant between the inlet and the outlet. Where the reactant stream further comprises oxygen, the first oxygen-containing gas stream and the further oxygen-containing gas stream can be drawn from the reactant stream.

In an embodiment of the apparatus for the selective oxidation of carbon monoxide to carbon dioxide, the carbon monoxide is present in a fuel stream introduced to an electrochemical fuel cell stack. The fuel stream further comprises hydrogen and carbon dioxide, and the stack comprises a plurality of fuel cells. The apparatus comprises:

means for containing a quantity of catalyst within at least a portion of a fuel stream passageway within the stack, the catalyst promoting the oxidation of carbon monoxide to carbon dioxide in the presence of oxygen.

In an embodiment of the apparatus wherein the stack comprises a fuel inlet, at least one anode, and a fuel outlet, the fuel stream is directed through a passageway containing catalyst before the fuel stream is introduced as a reactant stream to the at least one anode.

In another embodiment of an apparatus for the selective oxidation of carbon monoxide to carbon dioxide, the carbon monoxide is present in a fuel stream introduced to an electrochemical fuel cell. The fuel stream further comprises hydrogen and carbon dioxide. The apparatus comprises:

(a) first and second separator layers, the first and second layers substantially impermeable to the fuel stream; and (b) a catalytic assembly interposed between the first and second layers, the assembly comprising at least one layer of porous sheet material and a quantity of catalyst either disposed on at least one major surface of the at least one porous layer or impregnated between the major surfaces of the at least one porous layer, or both, the catalyst promoting the oxidation of carbon monoxide to carbon dioxide in the presence of oxygen;

whereby directing the fuel stream between the first and second layers causes the fuel stream to contact the catalyst.

The first and second layers are preferably formed of electrically conductive material and the at least one layer of porous sheet material is preferably electrically conductive. The selective oxidation apparatus can be assembled within the active section of an electrochemical fuel cell stack. The selective oxidation apparatus can also be assembled within a humidification section associated the stack, the humidification section being either integral with the stack or an external humidifier.

Where the first separator layer is a first fluid flow field plate, the first plate has an inlet for introducing the fuel stream to a major surface thereof and an outlet for discharging the fuel stream from the major surface, the major surface has formed therein means for directing the fuel stream from the fuel stream inlet to the fuel stream outlet. The first plate preferably has a plurality of openings formed therein for introducing an oxygen-containing gas stream into the fuel stream between the fuel stream inlet and the fuel stream outlet. The plurality of openings are preferably uniformly spaced between the fuel stream inlet and fuel stream outlet, whereby the concentration of oxygen within the fuel stream is maintained substantially constant between the fuel stream inlet and the fuel stream outlet. Where the fuel stream further comprises oxygen, the oxygen-containing gas stream can be drawn from the fuel stream.

In one preferred apparatus, the directing means comprises at least one continuous channel interconnecting the fuel stream inlet and the fuel stream outlet. The at least one continuous channel can comprise a single continuous channel. The at least one continuous channel can also comprise a plurality of continuous channels.

In another preferred apparatus, the directing means comprises at least one inlet channel extending from the fuel stream inlet and at least one outlet channel extending from the fuel stream outlet, wherein the at least one inlet channel is discontinuous with respect to the at least one outlet channel, whereby the fuel stream flows from within the at least one inlet channel to the at least one outlet channel through the interstitial spaces of the catalytic assembly. The at least one outlet channel preferably comprises at least two outlet channels and each of the at least one inlet channels is preferably interposed between adjacent outlet channels, such that the fuel stream inlet and the fuel stream outlet channels are interdigitated.

Where the second separator layer comprises a second fluid flow field plate, the second plate has an inlet for introducing the fuel stream to a major surface thereof and an outlet for discharging the fuel stream from the major surface, the major surface has formed therein means for directing the fuel stream from the fuel stream inlet to the stream outlet.

In still another preferred apparatus, the catalytic assembly comprises at least two layers of porous sheet material, the apparatus further comprises:

(c) at least one intervening separator layer having a plurality of openings formed therein between the major surfaces thereof, each of the at least one intervening separator layer interposed between adjacent porous layers.

The at least two layers of porous sheet material are preferably electrically conductive.

The first and second separator layers and the at least one porous layer typically have a planar configuration. The first and second separator layers and the at least one porous layer can also have a tubular configuration.

BRIEF DESCRIPTION OF THE DRAWINGS

FIG. 2 is an exploded side view of a fuel cell including a membrane electrode assembly interposed between two fluid flow field plates having reactant flow channels formed in the major surfaces of the plates facing the electrodes.

FIG. 3 is an exploded side view of a fuel cell including a membrane electrode assembly having integral reactant flow channels interposed between two separator layers.

DETAILED DESCRIPTION OF THE PREFERRED EMBODIMENTS

Figure 1:
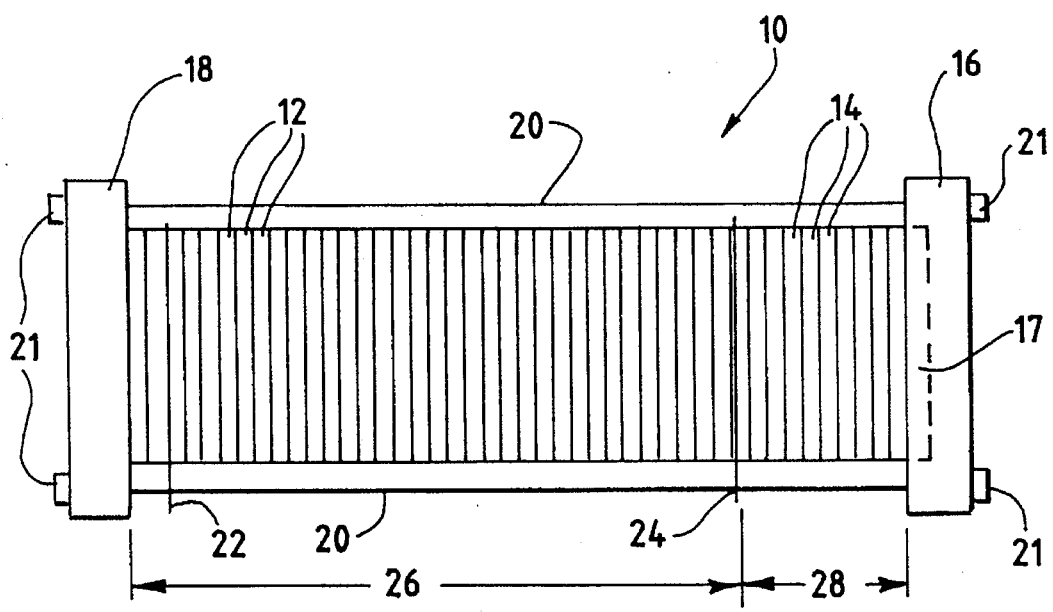
FIG. 1 is a side elevation view of a fuel cell stack showing the electrochemically active and humidification sections.

Turning first to FIG. 1, a fuel cell stack assembly 10 includes an electrochemically active section 26 and optionally includes a humidification section 28. Stack assembly 10 is a modular plate and frame design, and includes a compression end plate 16 and a fluid end plate 18. An optional pneumatic piston 17, positioned within compression end plate 16, applies uniform pressure to the assembly to promote sealing. Bus plates 22 and 24 located on opposite ends of active section 26 provide the negative and positive contacts, respectively, for the electrical path directing current generated by the assembly to an external electrical load (not shown). Tie rods 20 extend between end plates 16 and 18 to retain and secure stack assembly 10 in its assembled state with 10 fastening nuts 21.

Active section 26 includes, in addition to bus plates 22 and 24, a plurality of fuel cell repeating units 12. Each repeating unit 12 consists of a membrane electrode assembly, an anode fluid flow field plate, a cathode fluid flow field plate (or alternatively anode and cathode separator layers if the anode and cathode reactant flow channels are formed in the surfaces of the electrode material) and optionally a cooling jacket, as described in more detail below. In the assembly illustrated in FIG. 1, the repeating units 12 are electrically coupled in series by virtue of the contact between the electrically conductive layers which form the flow field plates (or the separator layers) and the cooling jackets.

Optional humidification section 28 includes a plurality of humidification assemblies 14, each assembly 14 consisting of fuel or oxidant reactant flow field plate, a water flow field plate, and a water transport membrane interposed between the reactant flow field plate and the water flow field plate. When present, humidification section 28 imparts water to the fuel and oxidant streams fed to active section 26, thereby preventing the membranes within the active section from drying out.

FIG. 2 illustrates a fuel cell 30, which includes a membrane electrode assembly 32 interposed between rigid flow field plates 34 and 36, preferably formed of graphite or a graphite composite material. Membrane electrode assembly 32 consists of an ion exchange membrane 42 interposed between two electrodes, namely, anode 44 and cathode 46. Anode 44 and cathode 46 are typically formed of porous electrically conductive sheet material, preferably carbon fiber paper, and have planar major surfaces. Electrodes 44 and 46 have a thin layer of catalyst material disposed on their major surfaces at the interface with membrane 42 to render them electrochemically active.

As shown in FIG. 2, anode flow field plate 34 has at least one open faced channel 34a engraved, milled or molded in its major surface facing membrane 42. Similarly, cathode flow field plate 36 has at least one open faced channel 36a engraved, milled or molded in its major surface facing membrane 42. When assembled against the cooperating surfaces of electrodes 44 and 46, channels 34a and 36a form the reactant flow field passages for the fuel and oxidant streams, respectively.

Turning now to FIG. 3, a fuel cell 50 employs a membrane electrode assembly 52 having integral reactant fluid flow channels. Fuel cell 50 includes membrane electrode assembly 52 interposed between lightweight separator layers 54 and 56, which are substantially impermeable to the flow of reactant fluid therethrough. Membrane electrode assembly 52 consists of an ion exchange membrane 62 interposed between two electrodes, namely, anode 64 and cathode 66. Anode 64 and cathode 66 are formed of porous electrically conductive sheet material, preferably carbon fiber paper. Electrodes 64 and 66 have a thin layer of catalyst material disposed on their major surfaces at the interface with membrane 62 to render them electrochemically active.

As shown in FIG. 3, anode 64 has at least one open faced channel 64a formed in its surface facing away from membrane 62. Similarly, cathode 66 has at least one open faced channel 66a formed in its surface facing away from membrane 62. When assembled against the cooperating surfaces of separator layers 54 and 56, channels 64a and 66a form the reactant flow field passages for the fuel and oxidant streams, respectively.

Figure 4:
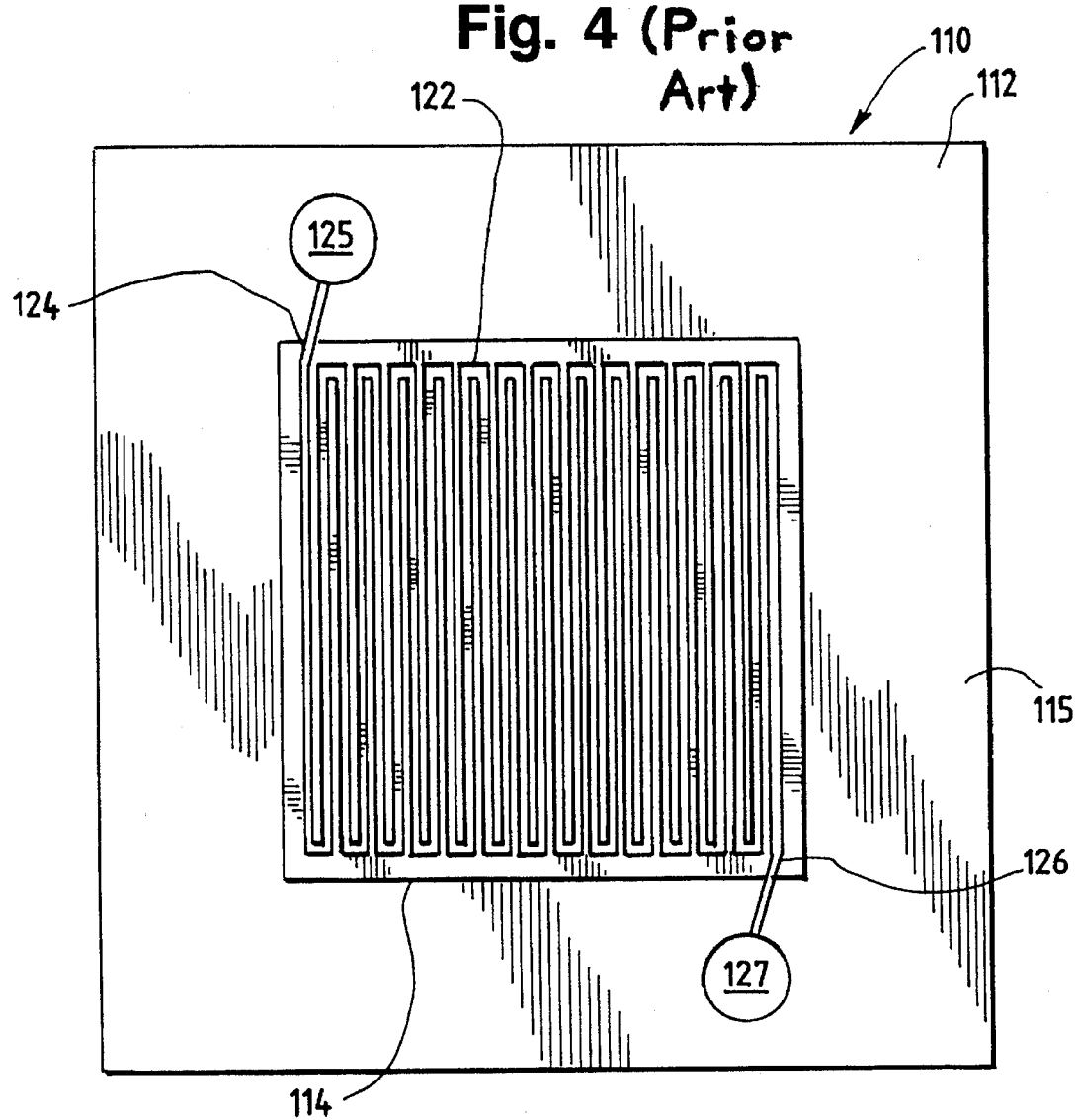
FIG. 4 is a top plan view of a fluid flow field plate having a single continuous open-faced channel that traverses the central area of the plate in a plurality of passes between a fluid inlet directly connected to a fluid supply opening and a fluid outlet directly connected to a fluid exhaust opening, as described in Watkins U.S. Pat. No. 4,988,583.

A prior art fluid flow field plate 110 having a single continuous reactant flow channel, described in Watkins U.S. Pat. No. 4,988,583, is shown in FIG. 4. Major plate surface 115 has formed therein, typically by numerically controlled machining, stamping or molding, a single continuous fluid flow channel 122. Channel 122 has a fluid inlet 124 at one end and a fluid outlet 126 at the other end. Fluid inlet 124 is directly connected to a fluid supply opening or manifold 125 formed in plate 112. Fluid outlet 126 is directly connected to a fluid exhaust opening or manifold 127 formed in plate 112. Fluid supply 125 is connected to a source of fuel (not shown) in the case of the anode flow field plate or a source of oxidant (not shown) for the cathode flow field plate. Channel 122 traverses in a plurality of passes a major central area of plate 112, which in turn generally corresponds to the electrocatalytically active region of the anode or cathode to which it is adjacent when assembled sealant or gasketing material 114 fluidly isolates the major central area of plate 112.

Figure 5:
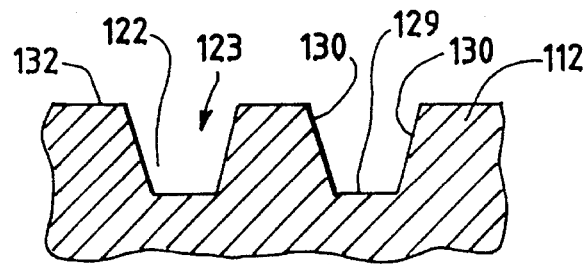
FIG. 5 is an enlarged sectional view of the channels formed in the surface of the fluid flow field plate illustrated in FIG. 4.

FIG. 5 shows a cross sectional view of the channel 122 of fluid flow field plate 110 in FIG. 4. Channel 122 has a configuration that is typical of machined open face channels, namely, it is defined by a substantially flat base 129 and opposing side walls 130 which diverge outwardly toward the open face 123 of channel 122. The illustrated cross sectional configuration of channel 122 is designed to minimize tool wear. Channel 122 is preferably of uniform depth throughout its length. A series of lands 132 is defined between the passes of channel 122. When assembled, the lands 132 between channels 122 are in contact with the electrode surface adjacent thereto, so that each flow field plate also functions as a current collector.

Figure 6:
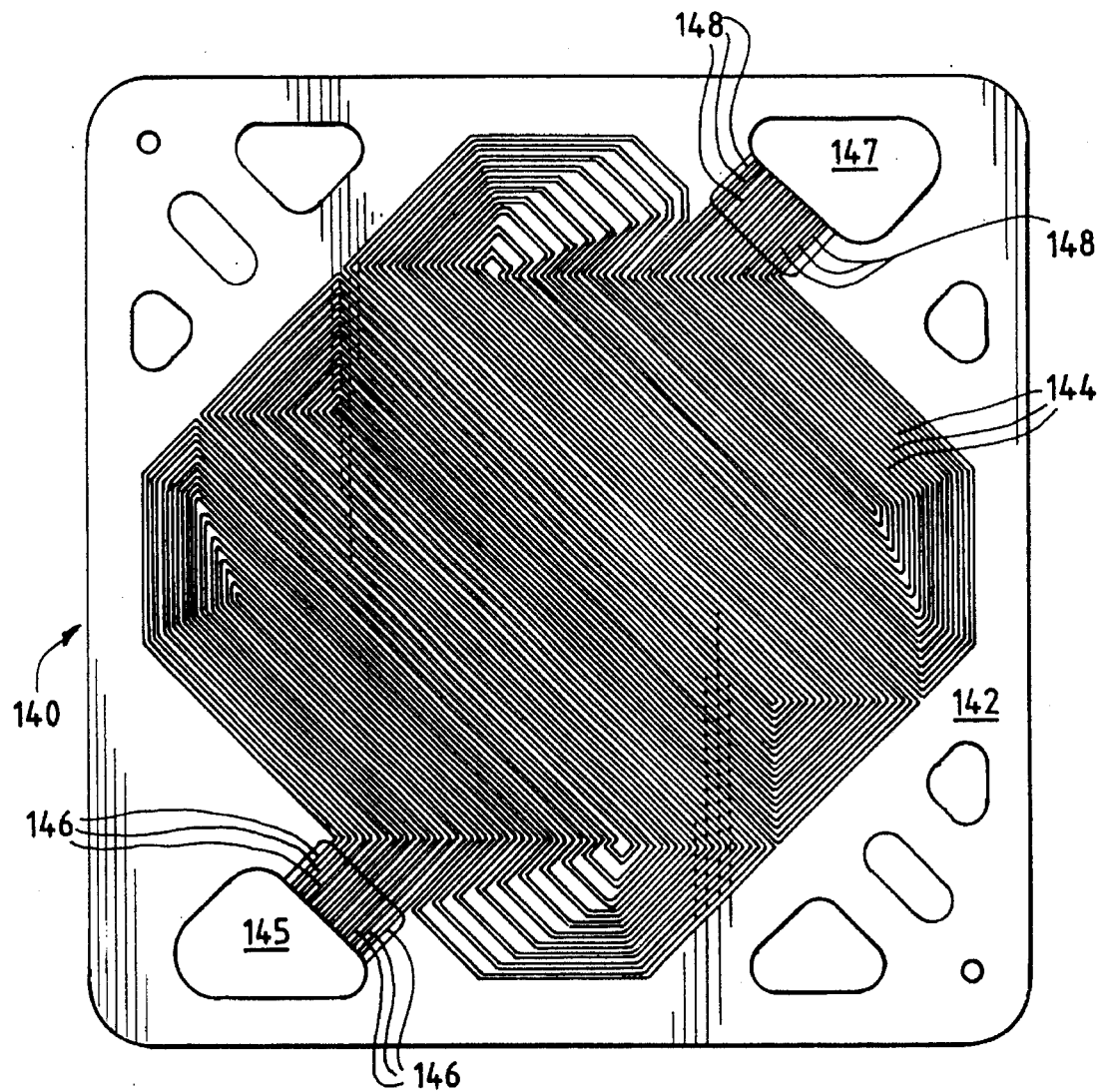
FIG. 6 is a top plan view of a fluid flow field plate having multiple continuous open-faced channels, each of which traverses the central area of the plate in a plurality of passes between a fluid inlet directly connected to a fluid supply opening and a fluid outlet directly connected to a fluid exhaust opening, as described in Watkins U.S. Pat. No. 5,108,849.

A prior art fluid flow field plate 140 having multiple continuous reactant flow channels, described in Watkins U.S. Pat. No. 5,108,849, is shown in FIG. 6. Major surface 142 has formed therein a plurality of flow field channels, several of which are designated by the numeral 144. Channels 144 each define a generally serpentine path between fluid supply opening or manifold 145 and fluid exhaust opening or manifold 147. Each channel 144 has an inlet end 146 and an outlet end 148 directly connected to the respective fluid supply openings or ports 145 and fluid exhaust openings or ports 147. Plate 140, which contains 10 individual serpentine channels 144, has been found to operate effectively in a fuel cell adjacent to the cathode, and is sometimes referred to as a 10-pass cathode flow field plate.

A greater or lesser number of channels 144 could be incorporated in the plate, such as, for example, in the case of a 2-pass flow field plate which has been found to operate effectively adjacent to the anode, and is sometimes referred to as a 2-pass anode flow field plate.

Figure 7:
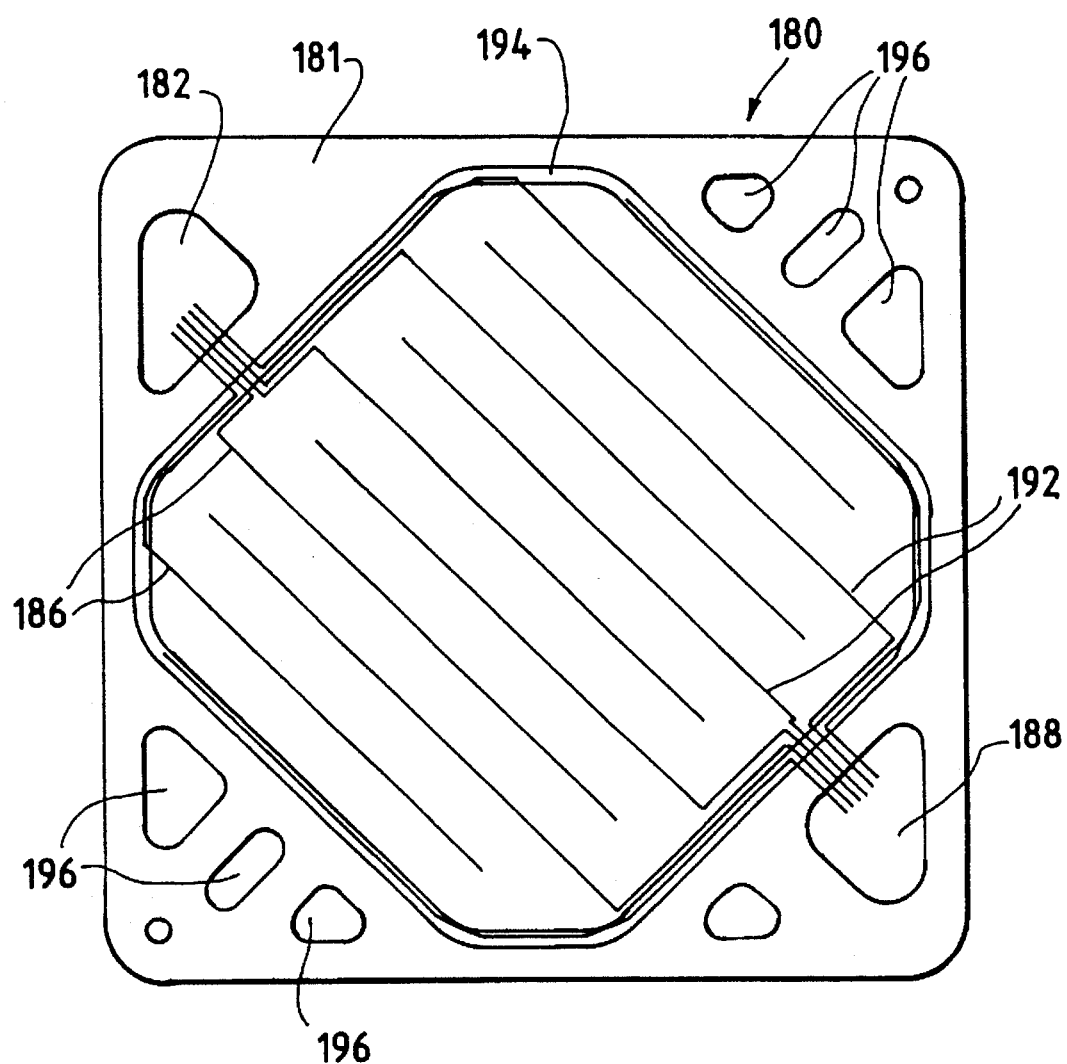
FIG. 7 is a top plan view of a fluid flow field plate having 11 discontinuous, interdigitated fluid flow channels, 5 channels of which are inlet channels extending from a reactant inlet opening and 6 channels of which are outlet channels extending from a reactant outlet opening, each of the inlet channels being disposed between a pair of outlet channels.

FIG. 7 shows a fluid flow field plate 180 having 11 discontinuous, interdigitated fluid flow channels. Plate 180 has a fluid inlet 182 formed in the surface 181 thereof. Inlet channels 186 extend from inlet 182 toward the central region of plate 180, which is adjacent to the catalytically active region of the porous sheet material with which plate 180 is associated. Plate 180 also has a fluid outlet 188 formed in the surface 181 of plate 180. Outlet channels 192 extend from outlet 188 toward the central region of the plate 180. As illustrated in FIG. 7, inlet channels 186 and outlet channels 192 are interdigitated, so that a pressurized fluid stream entering through opening 182 will be directed to inlet channels 186. At that point, the fluid stream will be forced through the interstices of the adjacent porous electrode material (not shown) on either side of each inlet channel 186 to one of the nearby outlet channels 192. From there, the fluid stream will flow through outlet 188, where it is discharged from the flow field plate 180.

As shown in FIG. 7, plate 180 contains 11 discontinuous fluid flow channels, 5 channels of which are inlet channels extending from the inlet and 6 channels of which are outlet channels extending from the outlet. Each of the inlet channels is preferably disposed between a pair of outlet channels so that the fluid stream from the inlet channels is uniformly directed from either side of the inlet channels to one of the neighboring outlet channels.

FIG. 7 also illustrates the location of a sealant or gasketing material 194 which contacts surface 181 and circumscribes the central area of plate 180. Sealant or gasketing material 194 isolates and defines within it the catalytically active region of the fuel cell plate 180. Plate 180 also has other openings 196 formed therein, which serve as the manifolds for other reactant and coolant streams within the fuel cell.

Figure 8:
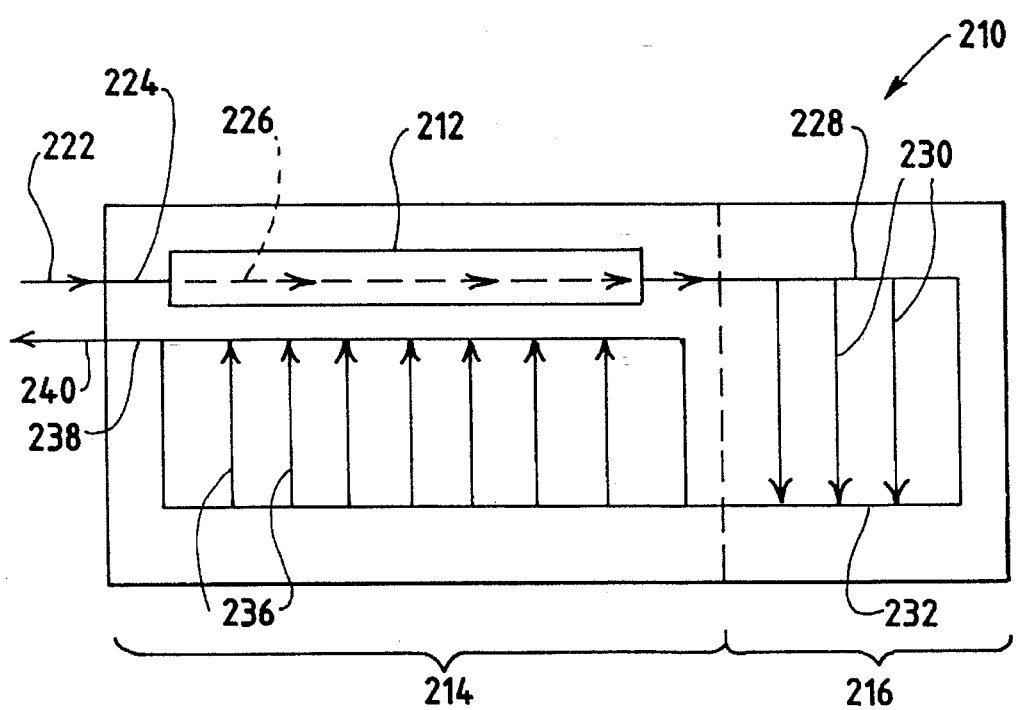
FIG. 8 is a schematic diagram of a fuel cell stack having an integral selective oxidizer located in the fuel manifold between the inlet to the fuel cell and the humidification section.

FIG. 8 schematically illustrates a fuel cell stack 210 having an integral selective oxidizer 212. Stack 210 includes an active section 214 and an optional humidification section 216. Pressurized inlet fuel stream 222 enters stack 210 and is directed through manifold 224 to selective oxidizer 212. Selective oxidizer 212 is preferably a fixed catalyst bed, isothermal reactor of the type described in U.S. patent application Ser. No. 07/959,070 filed Oct. 9, 1992, incorporated herein in its entirety. The fuel stream flowing through selective oxidizer 212 is illustrated by the broken lines in FIG. 8 as stream 226. The fuel stream exiting selective oxidizer 212 is directed through manifold 228 of humidification section 216. In the humidification section, the stream from manifold 228 is directed through a plurality of parallel humidification cells. Two of the fuel streams within the humidification cells are designated in FIG. 8 as streams 230. The humidification cells preferably comprise supported humidification membranes interposed between fluid flow field plates, one of which typically directs water through the humidification cell and the other of which directs the reactant stream to be humidified. The humidified fuel stream exits the humidification section via manifold 232 and enters active section 214. In the active section 214, the fuel stream is directed through a plurality of fuel cells to participate in the desired electrochemical reaction of hydrogen and oxygen. Two of the fuel streams through the fuel cells are designated in FIG. 8 as streams 236. The fuel stream containing the unreacted components exits the active section of stack 210 via manifold 238 as exhaust fuel stream 240.

Figure 9:
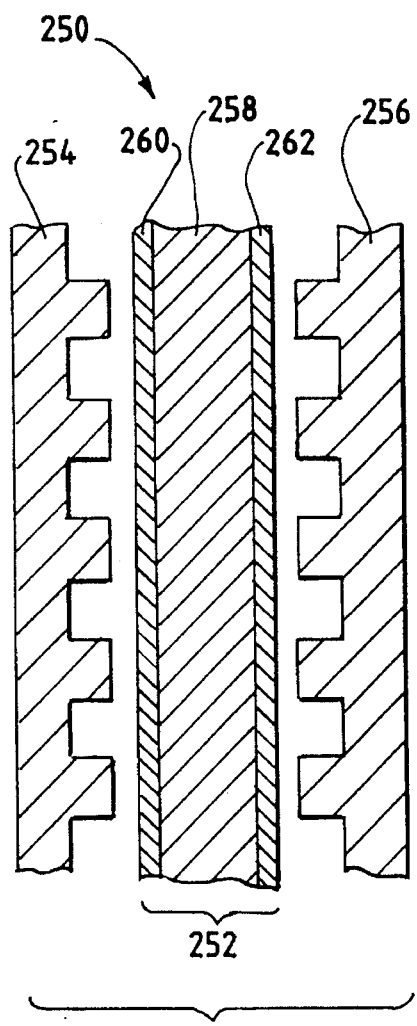
FIG. 9 is an enlarged sectional view of a selective oxidizing catalytic assembly interposed between two fluid flow field plates.

FIG. 9 shows an apparatus 250 having a selective oxidizing catalytic assembly 252 interposed between two fluid flow field plates 254 and 256. Assembly 252 comprises layer 258, preferably formed of porous electrically conductive sheet material, most preferably carbon fiber paper, having layers 260 and 262 of catalyst disposed on each major surface of layer 258. The catalyst promotes the oxidation of carbon monoxide to carbon dioxide in the presence of oxygen. The oxygen can either be present in small quantities in the fuel stream itself or introduced via oxidant bleed methods, for example those described in the U.S. patent application Ser. No. 08/126,525 filed concurrently herewith entitled "Method And Apparatus For Retarding Carbon Monoxide Production In The Reactant Streams Of Electrochemical Fuel Cells". As shown in FIG. 9, pressurized fuel streams directed through the channels formed in the surfaces of plates 254 and 256 facing catalytic assembly 252 such that the fuel streams will contact the catalytic layers 260 and 262, respectively.

Figure 10:
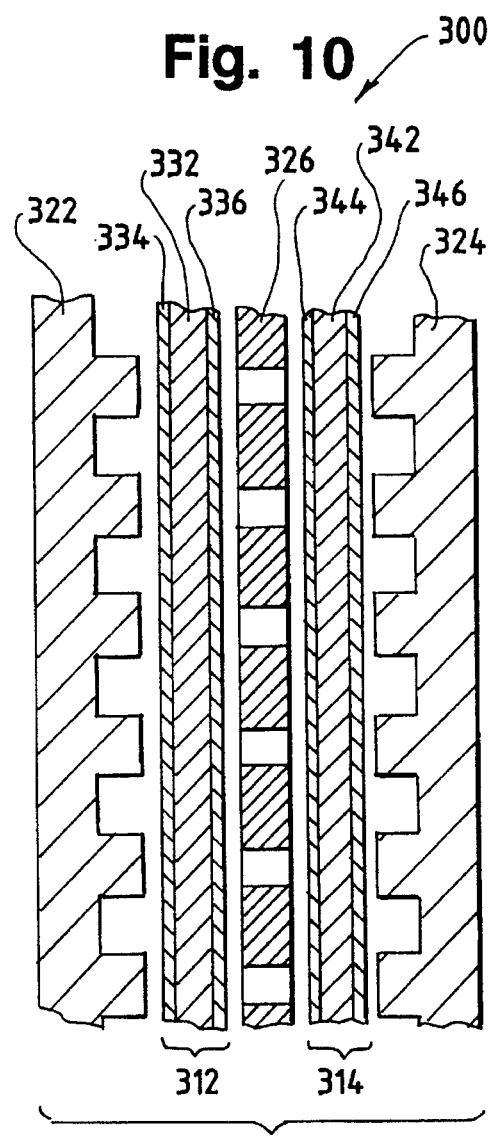
FIG. 10 is an enlarged sectional view of two selective oxidizing catalytic assemblies interposed between two fluid flow field plates and a separator plate having openings formed therein interposed between the two catalytic assemblies.

FIG. 10 shows an apparatus 300 having two selective oxidizing catalytic assemblies 312 and 314 interposed between two fluid flow field plates 322 and 324, and a separator plate 326 having openings or ports formed therein interposed between the two catalytic assemblies 312 and 314. Assembly 312 comprises layer 332, preferably formed of porous electrically conductive sheet material, most preferably carbon fiber paper, having layers 334 and 336 of catalyst disposed on each major surface of layer 332. Assembly 314 comprises layer 342, preferably formed of porous electrically conductive sheet material, most preferably carbon fiber paper, having layers 344 and 346 of catalyst disposed on each major surface of layer 342. The catalyst promotes the oxidation of carbon monoxide to carbon dioxide in the presence of oxygen. As shown in FIG. 10, pressurized fuel streams directed through the channels formed in the surfaces of plates 322 and 324 facing catalytic assemblies 312 and 314, as well as through the openings formed in plate 326, such that the fuel streams will contact the catalytic layers 334, 336, 344 and 346.

Figure 11:
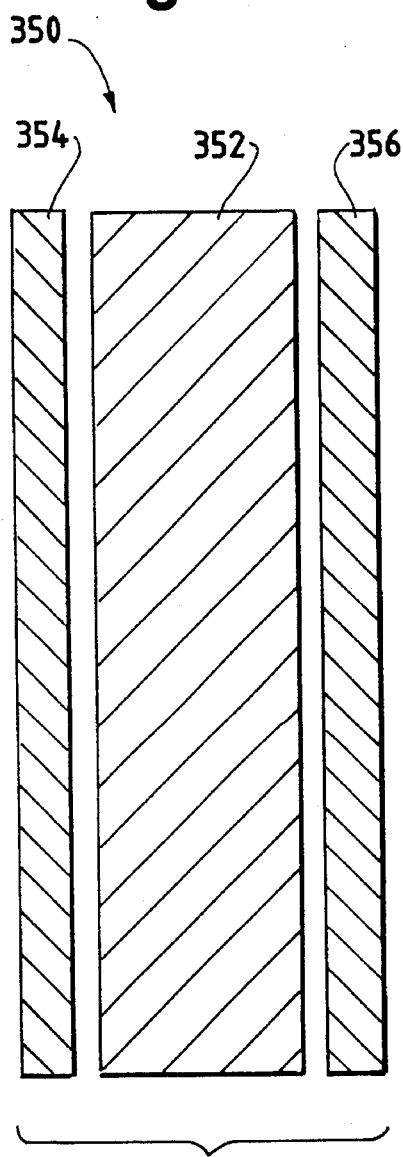
FIG. 11 is an enlarged sectional view of a selective oxidizing assembly having catalyst impregnated therein, interposed between two separator layers.

FIG. 11 shows an apparatus 350 having a selective oxidizing catalytic assembly 352 interposed between two separator layers 354 and 356. Assembly 352 if formed of porous electrically conductive sheet material, most preferably carbon fiber paper, having a selective oxidizing catalyst disposed within the interstices of the porous material, for example, by electrodeposition or other suitable technique for impregnating catalyst within the interior of assembly 352. Additionally, catalyst can also be disposed on either, or both, of the major surfaces of assembly 352.

The separator layers 354 and 356 shown in FIG. 11 are substantially impermeable to the fuel stream directed through assembly 352. A suitable material for the separator layers 354 and 356 is graphite foil. Pressurized fuel streams directed through assembly 352 between separator layers 354 and 356 via the interstices of the porous material of assembly 352 will contact the catalyst impregnated within assembly 352. Additionally, the porous layer of assembly 352 could be formed with discontinuous, interdigitated channels formed in one or both of the major surfaces facing the separator layers 354 and 356 (see FIG. 7).

Figure 12:
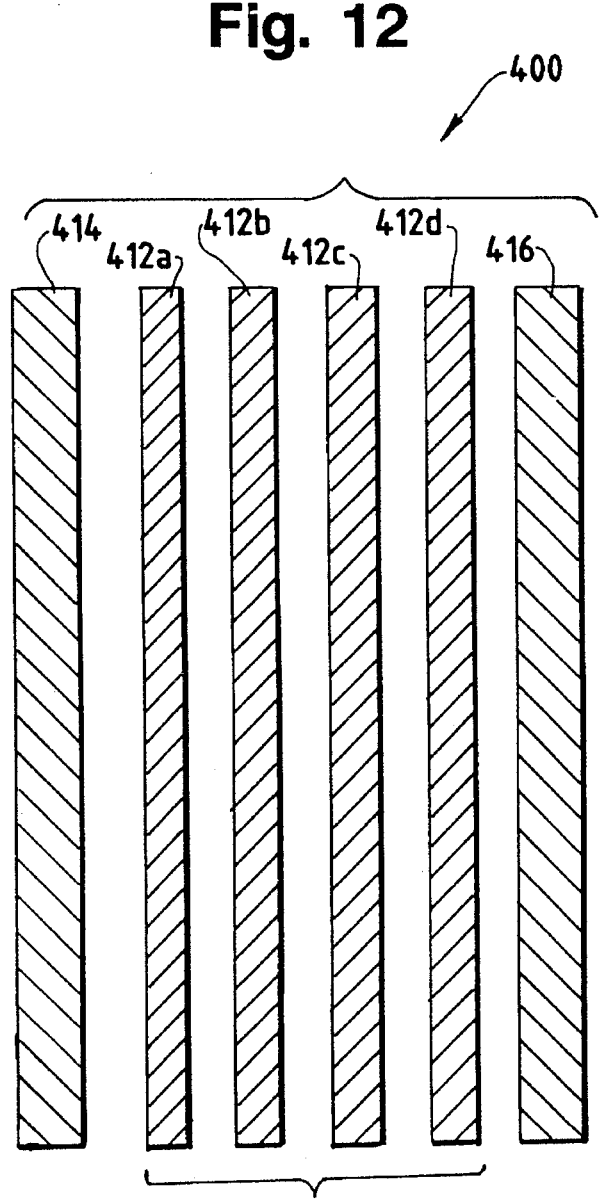
FIG. 12 is an enlarged sectional view of four selective oxidizing assemblies, each having catalyst impregnated therein, all interposed between two separator layers.

FIG. 12 shows an apparatus 400 having four-layer selective oxidizing catalytic assembly 412 interposed between two separator layers 414 and 416. Each of the layers 412a, 412b, 412c and 412d is preferably formed of porous electrically conductive sheet material, most preferably carbon fiber paper, having a selective oxidizing catalyst disposed within the interstices of the porous material.

Figure 13:
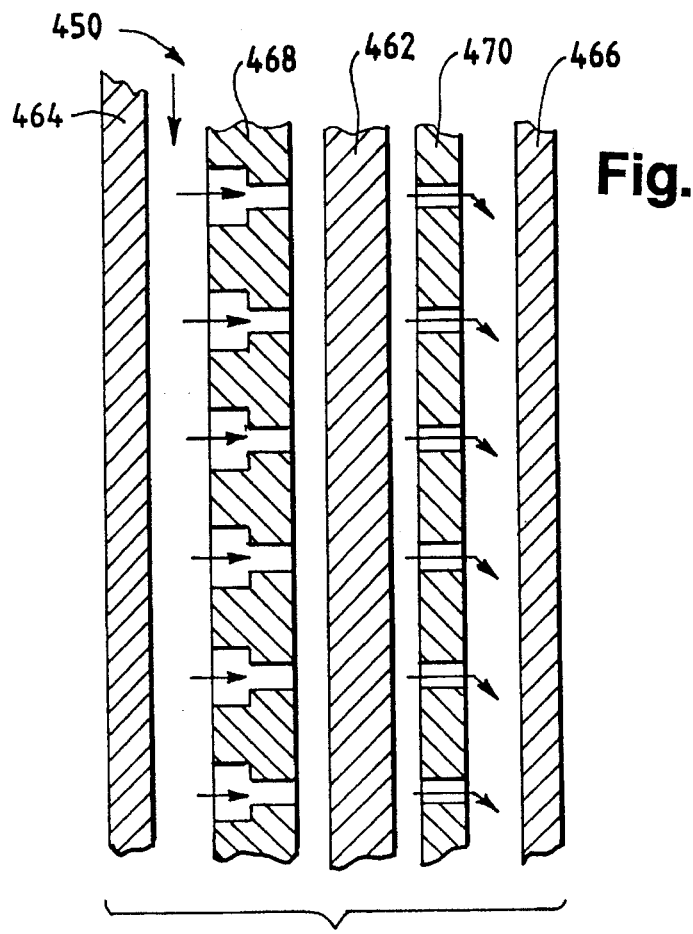
FIG. 13 is an enlarged sectional view of a selective oxidizing catalytic assembly interposed between two fluid flow field plates having uniformly spaced openings formed therein for introducing a fuel stream having substantially uniform composition, the fluid flow field plates and catalytic assembly being interposed between two separator layers.

FIG. 13 shows an apparatus 450 comprising a selective oxidizing catalytic assembly 462 interposed between two fluid flow field plates 468 and 470. The plates 468 and 470 have uniformly spaced openings or ports formed therein for introducing a fuel stream having substantially uniform composition. The plates 468 and 470 and catalytic assembly 462 are interposed between two separator layers 464 and 466, which are preferably substantially impermeable to the fuel stream. By adjusting the thickness of the assembly 462 and the spacing of the openings formed in the plates 468 and 470, the fuel stream (designated by the arrows in FIG. 13) can be prevented from flowing along the length of the assembly 462. Consequently, minimal CO is produced from the reverse water shift reaction.

Figure 14:
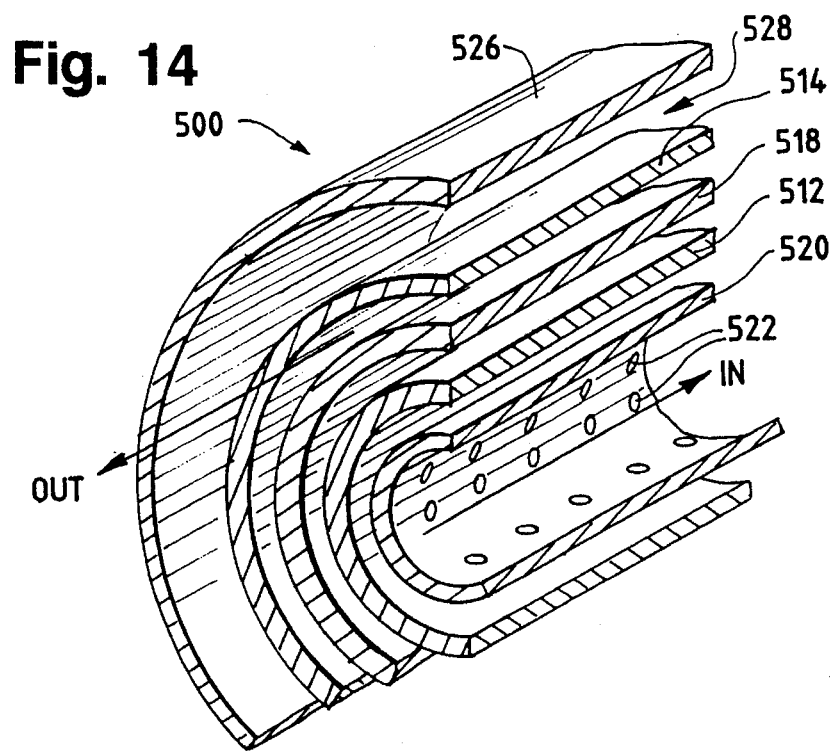
FIG. 14 is an exploded perspective view, partly in section, of a portion of the apparatus illustrated in FIG. 13, assembled in a tubular configuration and having an outermost jacket containing temperature control fluid.

FIG. 14 shows an apparatus 500, similar to that illustrated in FIG. 13, assembled in a tubular configuration and having an outermost jacket 526 containing temperature control fluid within space 528. As shown in FIG. 14, a selective oxidizing catalytic assembly 512 is interposed between two tubular layers 518 and 520. Layers 518 and 520 are preferably formed from porous, electrically conductive material, preferably carbon fiber paper, but other suitable material such as a metal foam could also be employed. Layers 518 and 520 have uniformly spaced openings or ports formed therein, two of which are designated in FIG. 14 as openings or ports 522, for introducing a fuel stream (designated by the arrow in FIG. 14) having substantially uniform composition. The interior space within layer 520 is the volume into which the fuel stream is introduced to apparatus 500, as indicated by the "IN" arrow in FIG. 14. Layers 518 and 520 and catalytic assembly 512 are contained within a tubular separator layer 514, which is preferably substantially impermeable to the fuel stream. The space between layers 514 and 518 is the volume from which the fuel stream is withdrawn from apparatus 500, as indicated by the "OUT" arrow in FIG. 14.

Figure 15:
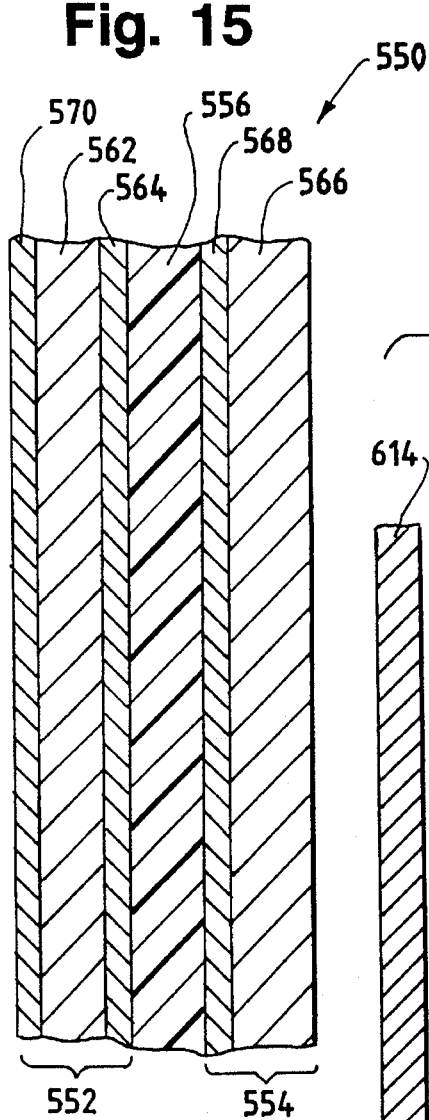
FIG. 15 is an enlarged sectional view of a membrane electrode assembly having a selective oxidizing catalyst layer disposed on the surface of the anode facing away from the membrane.

FIG. 15 shows a membrane electrode assembly 550 having a selective oxidizing catalyst layer 570 disposed on the surface of the anode 552 facing away from the membrane 556. Anode 552 includes a layer 562 preferably formed of porous electrically conductive sheet material, most preferably carbon fiber paper, and a layer 564 of electrocatalyst disposed on the surface of layer 562 facing membrane 556. Cathode 554 also includes a layer 566 of porous electrically conductive sheet material and a layer 568 of electrocatalyst disposed on the surface of layer 566 facing membrane 556.

Figure 16:
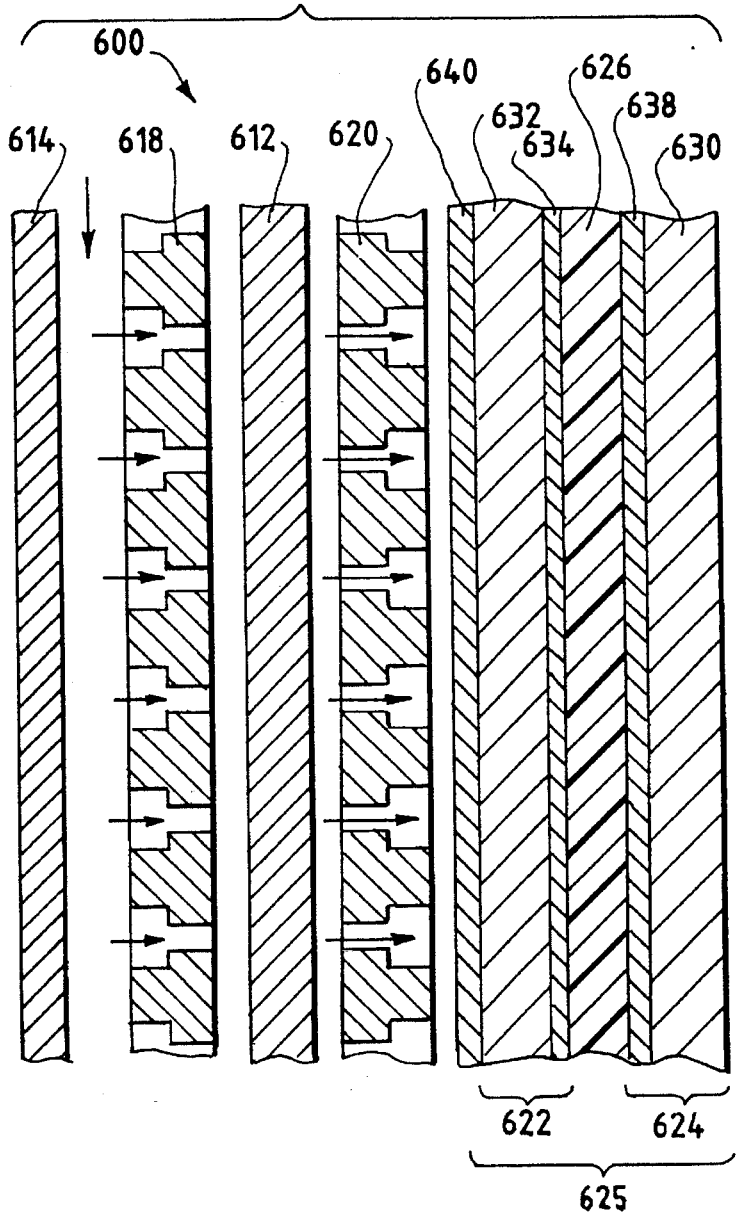
FIG. 16 is an enlarged sectional view of the selective oxidation apparatus illustrated in FIG. 13 in combination with the membrane electrode assembly having selective oxidizing catalyst disposed on the surface of the anode facing away from the membrane, as illustrated in FIG. 15.

FIG. 16 shows an apparatus 600 which combines the selective oxidation apparatus 450 illustrated in FIG. 13 with the membrane electrode assembly 550 having selective oxidizing catalyst disposed on the surface of the anode facing away from the membrane, as shown in FIG. 15. A selective oxidizing catalytic assembly 612 is interposed between two fluid flow field plates 618 and 620. The plates 618 and 620 have uniformly spaced openings or ports formed therein for introducing a fuel stream having substantially uniform composition. The plates 618 and 620 and catalytic assembly 612 are interposed between a separator layer 614 and a membrane electrode assembly 625. Separator layer 614 is preferably substantially impermeable to the fuel stream, the flow of which is designated by the arrows in FIG. 16. Membrane electrode assembly 625 has a selective oxidizing catalyst layer 640 disposed on the surface of the anode 622 facing away from the membrane 626. Anode 622 includes a layer 632 preferably formed of porous electrically conductive sheet material, most preferably carbon fiber paper, and a layer 634 of electrocatalyst disposed on the surface of layer 632 facing membrane 626. Cathode 624 also includes a layer 636 of porous electrically conductive sheet material and a layer 638 of electrocatalyst disposed on the surface of layer 636 facing membrane 626.

Figure 17:
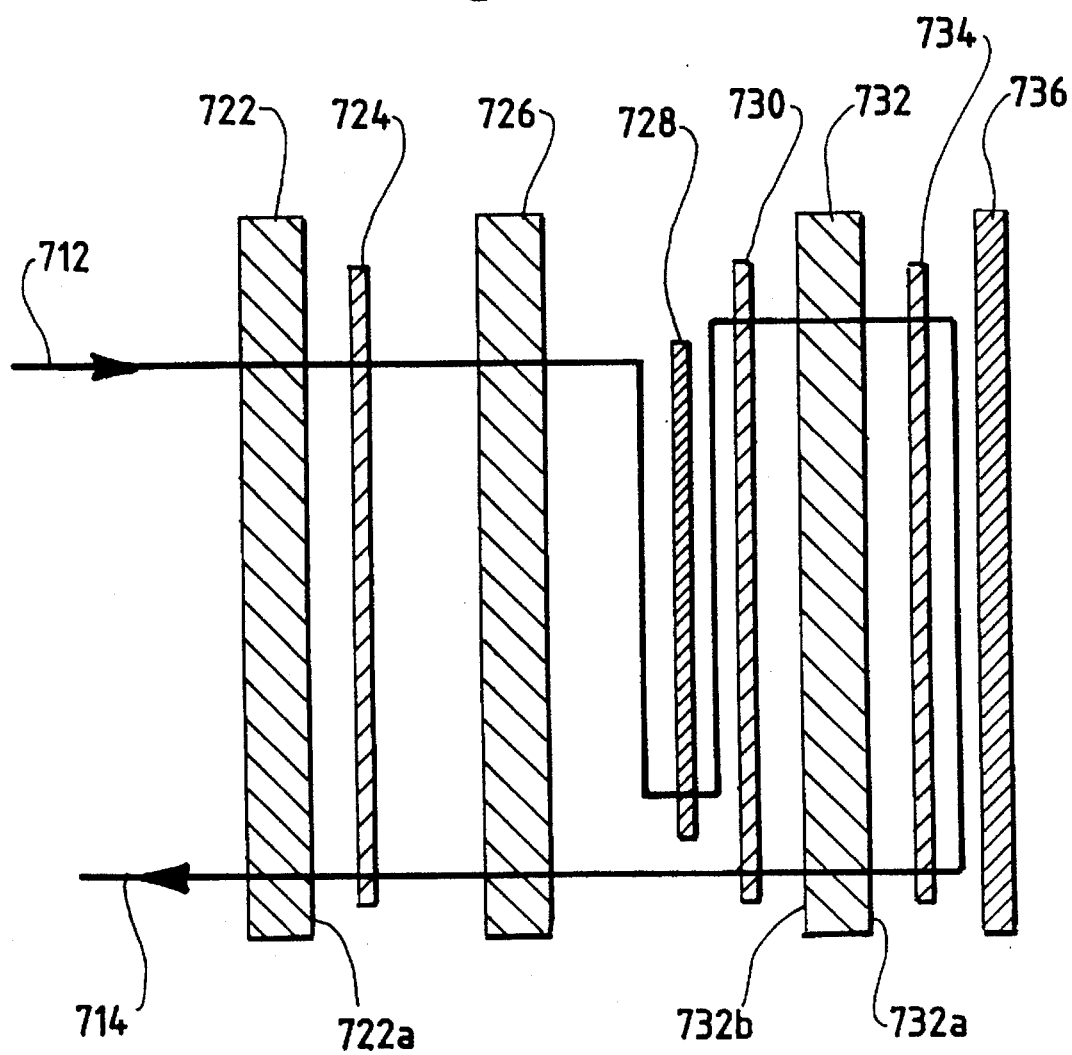
FIG. 17 is a schematic diagram of the fuel gas stream flow through an electrochemical fuel cell assembly including a membrane electrode assembly, a coolant jacket, and a selective oxidizer portion.

FIG. 17 shows a schematic diagram of the fuel stream flow through an electrochemical fuel cell assembly. Incoming fuel stream 712, containing carbon monoxide, is directed through manifold openings formed in a cooling water plate 722, a cooling water sealant or gasket 724, and a blank (i.e., no channels formed in either major surface thereof) separator plate 726. Cooling water plate 722 has channels formed therein on major surface 722a, such channels forming the flow field for the coolant fluid, which is preferably water, but can also be any other suitable cooling fluid. The volume formed by the assembly of plates 722, 726 and seal 724 is the cooling water jacket.

As further illustrated in FIG. 17, the fuel stream is then directed through and/or along the major surface(s) of a selective oxidation medium 728, preferably a porous sheet material, most preferably electrically conductive, such as, for example, carbon fiber paper, impregnated with a selective oxidation catalyst, such as, for example a mixture of 75% platinum/25% rhodium, by weight, to oxidize carbon monoxide present in the fuel stream. After selective oxidation, the fuel stream is directed through selective oxidizer sealant or gasket 730 and then through selective oxidation plate 732. The volume formed by the assembly of plates 726, 732 and sealant 730 is the selective oxidation reaction chamber which contains the selective oxidation medium 728. Plate 732 has a major surface 732b facing the selective oxidation medium 728 in which channels are formed to direct the flow of the fuel stream through the selective oxidation reaction chamber.

The fuel stream exiting the selective oxidizer flow field via openings (not shown) formed in plate 732 is then directed to the flow field channels formed in surface 732a of plate 732. There, the fuel stream participates in the reaction at the anode of the membrane electrode assembly 736. Anode MEA seal 734 seals the volume between plates 732 and MEA 736 where the electrochemical reaction at the anode occurs.

The exhaust stream from the anode is directed by manifold openings through selective oxidation plate 732, separator plate 726 and cooling water plate 722, where it is exhausted from the fuel cell assembly as exhaust stream 714.

Figure 18:
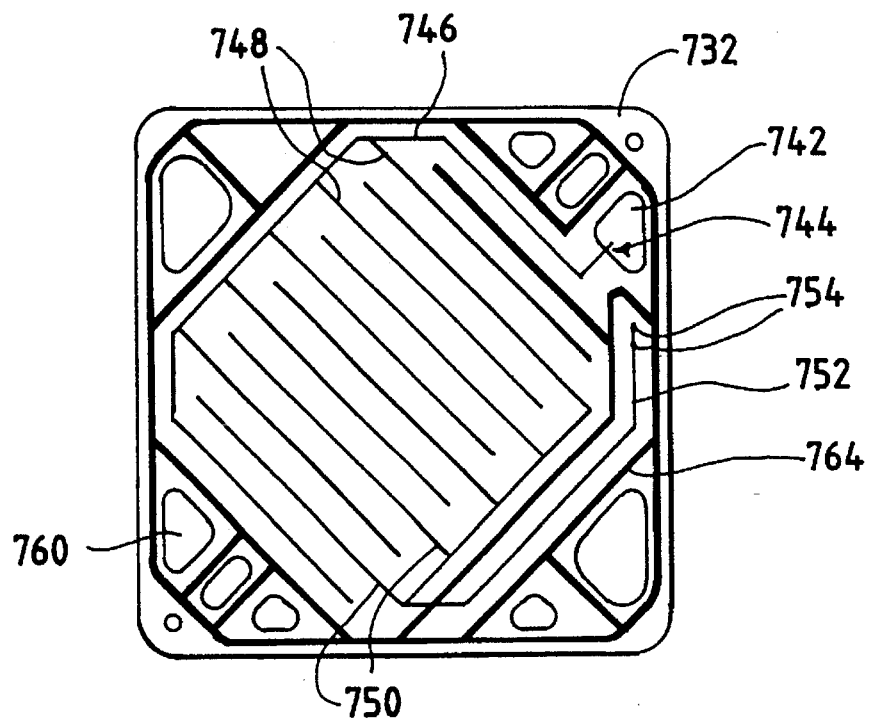
FIG. 18 is a top plan view of the selective oxidation side of a fluid flow field plate having 11 discontinuous, interdigitated channels and two ports for introducing a fuel stream to the opposite, anode fluid flow field side of the plate.

FIG. 18 shows the selective oxidation side of a fluid flow field plate 732 shown in FIG. 17. The selective oxidation side of plate 732 has 6 discontinuous inlet channels, two of which are designated in FIG. 18 as channels 748. The fuel stream enters the inlet channels 748 via an inlet header 746 connected to an inlet 744 from fuel stream manifold 742. The selective oxidation side of plate 732 also has 5 discontinuous outlet channels, two of which are designated in FIG. 18 as channels 750. The selectively oxidized fuel stream exits the outlet channels via an outlet header 752 which terminates in two ports 754 formed in plate 732. Ports 754 extend to the opposite anode fluid flow field side of plate 732. As shown in FIG. 18, the inlet and outlet channels on the selective oxidation side of plate 732 are arranged in interdigitated relation. The unreacted, exhaust fuel stream exits the anode side of the fuel cell via manifold opening 760.

Figure 19:
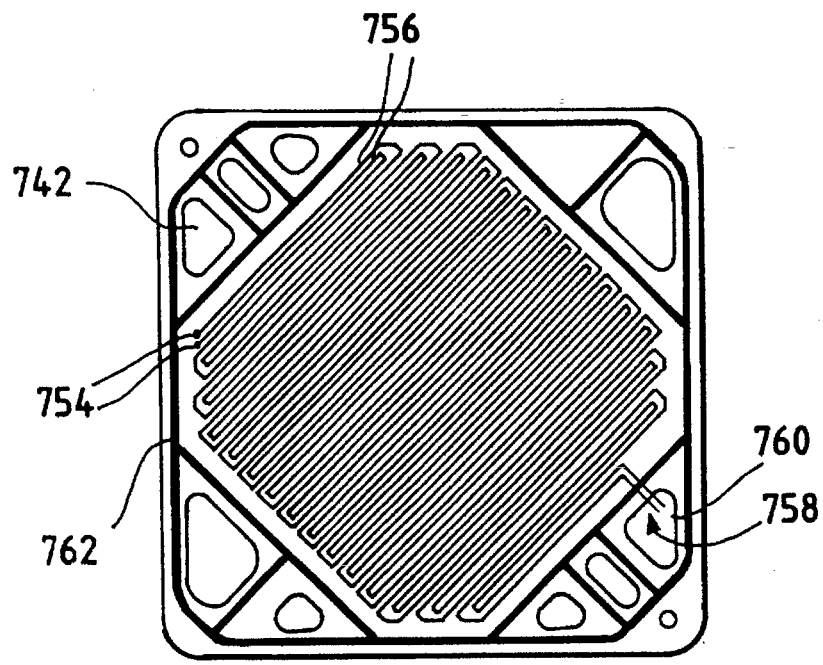
FIG. 19 is a top plan view of the anode fluid flow field side of the fluid flow field plate illustrated in FIG. 18, having two serpentine channels, each of which has two feed ports formed therein for receiving the selectively oxidized fuel stream introduced from the opposite selective oxidation side of the plate.

FIG. 19 shows the anode fluid flow field side of plate 732 illustrated in FIG. 18. The anode side of plate 732 has two serpentine channels 756, each of which has two ports 754 formed therein for receiving the fuel stream introduced from the opposite selective oxidation side of the plate 732. The fuel stream is directed through channels 756 to participate in the electrochemical reaction at the anode of the adjacent membrane electrode assembly (shown, for example, as MEA 736 in FIG. 17). The unreacted, exhaust fuel stream exits the anode side of the fuel cell via outlet 758 to fuel exhaust manifold 760. Channels 762 and 764 are two of the plurality of channels, shown in bolded lines in FIGS. 18 and 19, for containing the sealant or gasketing material which fluidly isolates each separate region on the major surfaces of plate 732.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An apparatus for selectively oxidizing carbon monoxide to carbon dioxide, said carbon monoxide present in a fuel stream introduced to an electrochemical fuel cell stack, the apparatus comprising:

an electrochemical fuel cell stack, said stack comprising a plurality of fuel cells, said stack further comprising a fuel inlet and a fuel outlet, said fuel cells comprising a plurality of electrochemically active areas containing electrocatalyst and a plurality of non-electrochemically active areas;

a passageway within said fuel stack, said passageway for directing a fuel stream within said stack between said fuel inlet and said fuel outlet, said fuel stream comprising carbon monoxide, carbon dioxide, and hydrogen;

means for containing a quantity of catalyst within at least a portion of said passageway, said catalyst promoting oxidation of carbon monoxide to carbon dioxide in the presence of oxygen, said at least a portion of said passageway located within said plurality of non-electrochemically active areas.

2. An apparatus for the selective oxidation of carbon monoxide to carbon dioxide, said carbon monoxide being present in a fuel stream introduced to an electrochemical fuel cell, said apparatus comprising an electrochemical fuel cell comprising:

(a) first and second separator layers, said first and second layers substantially impermeable to a fuel stream, said fuel stream comprising carbon monoxide, carbon dioxide, and hydrogen; and (b) a catalytic assembly disposed between said first and second layers, said catalytic assembly comprising at least one layer of porous sheet material having interstitial spaces said at least one layer of porous sheet material further comprising first and second major surfaces, said first major surface facing said first separator layer and said second major surface facing said second separator layer, said catalytic assembly further comprising a quantity of catalyst either disposed on said first major surface or said second major surface, or disposed within the interstitial spaces of said at least one porous layer, or any combination thereof, said catalyst promoting oxidation of carbon monoxide to carbon dioxide in the presence of oxygen;

whereby directing said fuel stream between said first and second layers through said interstitial spaces causes said fuel stream to contact at least a portion of said catalyst.

3. The apparatus of claim 2 wherein said first and second layers are formed of electrically conductive material and wherein said at least one layer of porous sheet material is electrically conductive.

4. The apparatus of claim 2 wherein said apparatus is within an active section of an electrochemical fuel cell stack.

5. The apparatus of claim 2 wherein said apparatus is within a humidification section of an electrochemical fuel cell stack.

6. The apparatus of claim 2 wherein said first separator layer is a first fluid flow field plate, said first plate having an inlet for introducing said fuel stream to a major surface of the first plate and an outlet for discharging said fuel stream from said major surface, said major surface having formed therein means for directing said fuel stream from said fuel stream inlet to said fuel stream outlet.

7. The apparatus of claim 6 wherein said first plate has a plurality of openings formed therein for introducing an oxygen-containing gas stream into said fuel stream between said fuel stream inlet and said fuel stream outlet.

8. The apparatus of claim 7 wherein said plurality of openings are uniformly spaced between said fuel stream inlet and fuel stream outlet whereby oxygen concentration within said fuel stream is maintained substantially constant between said fuel stream inlet and said fuel stream outlet.

9. The apparatus of claim 6 wherein said directing means comprises at least one continuous channel interconnecting said fuel stream inlet and said fuel stream outlet.

10. The apparatus of claim 9 wherein said at least one continuous channel comprises a single continuous channel.

11. The apparatus of claim 9 wherein said at least one continuous channel comprises a plurality of continuous channels.

12. The apparatus of claim 6 wherein said directing means comprises at least one inlet channel extending from said fuel stream inlet and at least one outlet channel extending from said fuel stream outlet, wherein said at least one inlet channel is discontinuous with respect to said at least one outlet channel.

13. The apparatus of claim 12 wherein said at least one outlet channel comprises at least two outlet channels and wherein each of said at least one inlet channel is disposed between said at least two adjacent outlet channels, such that said fuel stream inlet and said fuel stream outlet channels are interdigitated.

14. The apparatus of claim 6 wherein said second separator layer comprises a second fluid flow field plate, said second plate having an inlet for introducing said fuel stream to a major surface of the second plate and an outlet for discharging said fuel stream from said major surface, said major surface having formed therein means for directing said fuel stream from said fuel stream inlet to said stream outlet.

15. The apparatus of claim 2 wherein said at least one layer or porous sheet material catalytic assembly comprises at least two layers of porous at leas one layer of porous sheet material, said apparatus further comprising:

(c) at least one intervening separator layer having a plurality of openings formed therein each of said at least one intervening separator layer disposed between adjacent layers of porous sheet material.

16. The apparatus of claim 15 wherein said at least two layers of porous sheet material are electrically conductive.

17. The apparatus of claim 2 wherein said first and second separator layers and said at least one layer of porous sheet material have a planar configuration.

18. The apparatus of claim 2 wherein said first and second separator layers and said at least one layer of porous sheet material have a tubular configuration.

* * * * *